F. CONRAD.
SYSTEM OF ELECTRICAL DISTRIBUTION AND REGULATION.
APPLICATION FILED JULY 9, 1906.
1,112,438.
Patented Oct. 6, 1914.
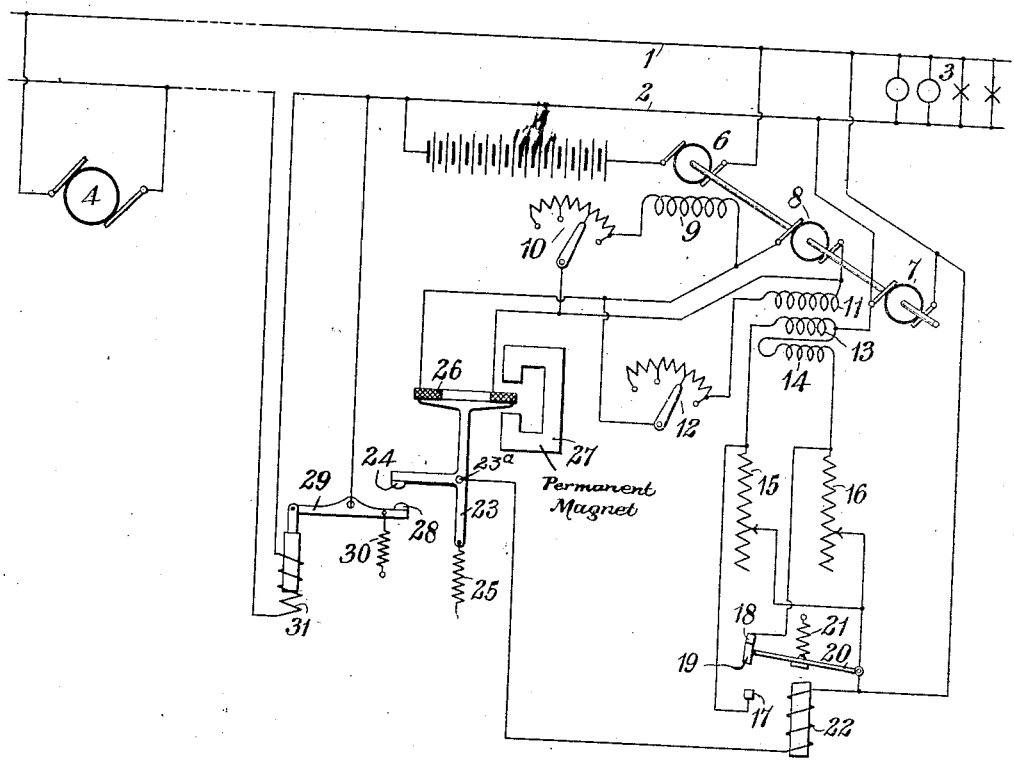
WITNESSES:
C. L. Belcher
Otto S. Schairer
INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION AND REGULATION.

1,112,438.  Specification of Letters Patent.  Patented Oct. 6, 1914.

Application filed July 9, 1906. Serial No. 325,291.

*To all whom it may concern:*

Be it known that I, FRANK CONRAD, a citizen of the United States, and a resident of Swissvale, in the county of Allegheny and State of Pennsylvania, have invented a new and useful Improvement in Systems of Electrical Distribution and Regulation, of which the following is a specification.

My invention relates to means for regulating the voltage and the charging and discharging of a storage battery that is connected to an electrical circuit, and it has for its object to provide simple and effective means of the character indicated, whereby the load upon a generator that supplies a circuit may be maintained substantially constant and the voltage applied to the circuit by the storage battery may also be maintained substantially constant whether it is fully or only partially charged.

A storage battery is frequently employed in combination with another source of energy for the purpose of supplying variable amounts of current to a distributing circuit, the storage battery charging when the current required by the circuit is less than a predetermined amount and discharging when it is greater than the predetermined amount. In such systems, the main source of energy need not be of sufficient capacity to supply the maximum amount of current required by the circuit, but only of a sufficient capacity to supply the average required amount. An inherent disadvantage in the use of a storage battery, however, has been that when it is fully charged the voltage is higher than when it is nearly discharged, and a variable voltage may, therefore, be impressed thereby upon a circuit to which it is connected.

In order that the voltage applied to a circuit by a storage battery may be maintained substantially constant, I propose to connect a booster generator in circuit with the battery and to so regulate the value and direction of the electromotive force thereof that it will either supplement or oppose that of the battery by an amount that is dependent upon the amount of current traversing the circuit and the condition and voltage of the battery.

The single figure of the accompanying drawing is a diagrammatic view of a system that embodies my invention.

Electrical circuit conductors 1 and 2, to which are connected suitable translating devices 3 that may require variable amounts of current during their operation, are supplied with energy from a suitable main source, such as a generator 4, and from a storage battery 5. Armature 6 of a booster generator is connected in series with the battery and may be operated by a motor 7 that is supplied with energy from the conductors 1 and 2, or it may be operated by some other suitable means. The motor 7, or other means employed for driving the armature 6, may also be adapted to operate the armature 8 of an exciter that supplies energy to field magnet winding 9 of the booster generator, in circuit with which is interposed a rheostat 10 in order that manual adjustment of the field excitation of the booster generator may be effected. It will, of course, be understood that the exciter may be operated by a different means from that which drives the booster generator, though it will usually be found most convenient to employ a motor, such as that indicated at 7, for operating the armatures of both machines.

The exciter is provided with a main field magnet winding 11 that is connected in series with a rheostat 12, for effecting manual adjustment of the excitation thereof, and across terminals of the armature 8, and is also provided with two auxiliary field magnet windings 13 and 14, the magnetizing effects of which are arranged to oppose each other. The auxiliary field magnet windings 13 and 14 are connected, respectively, in series with resistances 15 and 16 and across the circuit conductors 1 and 2, and the resistances are adapted to be short-circuited by means of a device comprising two stationary contact terminals 17 and 18, that are connected, respectively, to terminals of the resistances 15 and 16, and a movable contact terminal 19 that is adapted to be vibrated between the stationary contact terminals by means of a pivoted arm 20. The ampere turns of the field magnet winding 11 being insufficient to fully excite the field, it becomes fully excited only when one of the resistances 15 and 16 is short-circuited. The numbers of ampere turns of the auxiliary field magnet windings are such that when one of the resistances is short-circuited and the corresponding field magnet winding opposes the magnetizing action of the main field magnet winding, the polarity of the field may be reversed thereby; that is, the auxiliary field magnet windings must have sufficient ampere turns to overcome the residual magnetization of the field.

The arm 20 is normally maintained in its uppermost position by means of a spring 21 and is moved to its lowermost position by means of a magnet having a winding 22, one terminal of which is connected to circuit conductor 1 and the other terminal to a T-shaped device 23 that is pivoted at 23ᵃ and that carries a contact terminal 24 at the free end of the main bar. The cross-bar of the T-shaped device is adapted to occupy a vertical position in which it is normally maintained by means of a spring 25, and it carries at its upper end a flat coil 26 that is connected across the terminals of the exciter armature 8. One side of the coil 26 is located between the opposing faces of a permanent magnet 27 and, when the coil is energized, it will be moved either to the right or to the left by the electro-magnetic action between the coil and the magnet, according to the direction of current flow in the coil 26.

The contact terminal 24 is adapted to engage another movable contact terminal 28 that is carried at one end of a lever 29 having a circuit connection to conductor 2, the contact terminal 24 and 28 coöperating to govern the circuit of the magnet winding 22. The lever 29 is adapted to be operated, against the force of a spring 30, by means of an electro-magnet having a winding 31 that is connected in series with circuit conductor 2 between the points of connection thereto of the generator 4 and the battery 5. Thus the position of the contact terminal 28, and the distance through which the contact terminal 24 must be moved in order to effect engagement of the two terminals, is caused to depend upon the amount of current which traverses the conductor 2 between the generator 4 and the storage battery 5.

When the battery is supplying current to the circuit to supplement that supplied by the generator, and its voltage equals that of the circuit, the booster is not required to either supplement or oppose the battery voltage and, consequently, its voltage should be zero. That is, the average field excitation of the booster and that of its exciter should be nil. In order to obtain zero average field excitation in the exciter, the auxiliary field magnet windings should either be equally energized or the average excitations afforded thereby should be equal. The latter condition is obtained in the present instance by causing a vibratory movement of the lever 20, which thereby moves the contact terminal 19 into engagement with the stationary terminals 17 and 18 alternately for equal periods of time. Suppose that, for a moment, the movable contact terminals 24 and 28 are in very close proximity, but out of engagement. Then, since the circuit of the magnet winding 22 is open, the contact terminal 19 will be moved into engagement with the stationary terminal 18 by the spring 21, and auxiliary field magnet winding 14 will be more strongly excited than the winding 13 because of the shunting of the resistance 16 in series therewith. This will cause the exciter to generate a voltage in such a direction that the booster voltage will oppose that of the battery. The current in the coil 26 will then be in such a direction that the coil will be repelled toward the left by the permanent magnet, against the action of the spring 25, and the terminal 24 will consequently be lowered into engagement with the terminal 28. At the same time, the current supplied by the main generator to the circuit increases slightly and causes stronger energization of the magnet winding 31, which will cause the lower terminal 28 to be moved upward and thereby assist in effecting engagement of the contact terminals 24 and 28. The magnet winding 22 then becomes energized and contact terminal 19 is moved downward into engagement with stationary terminal 17. The field magnet winding 13 thereupon becomes more strongly energized than the winding 14 and the polarity of the exciter and booster generator fields will be reversed, and the booster will consequently generate a very small voltage supplementary to that of the battery. The direction of the current in the coil 26 also becomes reversed and it is moved toward the right by the permanent magnet 26, contact terminal 24 being thereby moved upward. The current supplied to the conductors 1 and 2 by the generator 4 then decreases slightly in amount, and the contact terminal 28 is moved downward by the spring 30 because of the reduced energization of the magnet winding 31. The contact terminals 24 and 28 are thus separated and the system continues to operate substantially in the manner set forth, so long as the voltage of the battery remains approximately equal to that of the circuit supplied therefrom and the current traversing the circuit remains substantially constant. It will, of course, be understood that, in practical operation, the contact terminal 19 will vibrate more or less rapidly between the stationary contact terminals 17 and 18 and that the contact terminals 24 and 28 will also be moved into and out of engagement at a corresponding rate. The fluctuations of the current that traverses the conductor 2 and of the exciter voltage will ordinarily occur between very narrow limits, and the fluctuations in the voltage of the booster generator will be scarcely noticeable under the conditions set forth, because the voltage is affected only indirectly or remotely by the operation of the auxiliary devices.

If the current required by the translating devices 3 increases in amount, the contact terminal 28 will be raised, on account of the increased energization of the magnet winding 31, so that engagement of contact terminal 24 therewith will occur sooner and the periods of engagement will consequently be longer than was previously the case. The periods of engagement of the movable contact terminal 19 with the stationary terminal 17 will then be longer than the periods during which it engages the stationary terminal 18, so that the average excitation of the auxiliary field magnet winding 13 will be greater than that of the winding 14, and the magnetization of the field magnet winding 9 of the booster generator will be of such strength and polarity that the voltage of the circuit will be maintained substantially constant.

It will, of course, be understood that when the load upon the circuit decreases, the contact terminal 28 is lowered, because of the reduced energization of the magnet winding 31, and engagement thereof with contact terminal 24 occurs later and the periods of engagement are correspondingly shorter. Then, in a manner which will readily be understood from the foregoing description, the voltage of the booster generator will be decreased to such a degree that the voltage between the conductors 1 and 2 will be maintained substantially constant.

If the voltage of the battery exceeds that of the circuit when it supplies current thereto, the battery, because of its higher voltage, tends to supply more than its proportionate amount of current, and the amount supplied by the generator is correspondingly reduced. Contact terminal 28 is consequently lowered and the period of time during which the contact terminal 19 engages stationary terminal 18, is longer than that during which it engages the stationary terminal 17, because the distance through which the contact terminal 24 must be moved by means of the coil 26 in order to cause engagement thereof with contact terminal 28 is increased. The average excitation of the booster field magnet winding 9 will then be of such strength and polarity that the booster voltage will oppose that of the battery by an amount approximately equal to the difference between the voltage of the circuit and that of the battery.

It will also be understood that if the combined battery and booster voltage is less than that of the circuit, contact terminal 28 will be slightly raised because of the tendency of the generator to supply more than its proportion of the current to the circuit. Then, since contact terminal 24 will be required to move a correspondingly shorter distance in order to make engagement with contact terminal 28, contact terminal 19 will be maintained in engagement with stationary terminal 17 for longer periods of time than with the stationary terminal 18. The average excitation of the booster field magnet winding 9 will then be of such strength and polarity that the booster armature will generate a voltage equal to the difference between the circuit voltage and that of the battery.

If the amount of current required by the translating devices 3 is equal to or less than that which can be supplied by the generator 4, the battery will be charged from the circuit conductors 1 and 2 at a rate that is dependent upon the amount of current supplied to the circuit by the generator 4. The contact terminal 28 is then lowered, on account of the decrease in the amount of current that traverses the conductor 2, and contact terminal 24 is consequently required to move a greater distance in order to come into engagement therewith, so that contact terminal 19 is maintained in engagement with stationary terminals 18 for longer periods of time than with stationary terminals 17. From the foregoing description, it will be understood that the booster voltage will oppose that of the battery and thereby help overcome the internal resistance of the battery and assist in effecting charging thereof.

The arrangement of the circuits and the characters and modes of operation of the various devices of the system may be considerably varied without altering the mode of operation of the invention or departing from its spirit, and I desire that all such modifications shall be included within its scope.

I claim as my invention:

1. The combination with an electrical circuit, and a dynamo-electric machine connected thereto, of an exciter generator for supplying the field magnet winding of the dynamo-electric machine having a main field magnet winding and two auxiliary field magnet windings arranged to act in opposition, resistances in circuit, respectively, with the auxiliary field magnet windings, and means for shunting the one or the other of the resistances that is responsive in operation to variations in the current traversing said circuit.

2. The combination with an electrical circuit, and a dynamo-electric machine connected thereto, of an exciter generator for supplying the field magnet winding of the dynamo-electric machine having a main field magnet winding and two auxiliary field magnet windings arranged to act in opposition, resistances in circuit, respectively, with the auxiliary field magnet windings, and means for shunting the one or the other of the resistances that is responsive in operation to variations in the current traversing said circuit and to the voltage of the exciter circuit.

3. The combination with an electrical circuit, and a dynamo-electric machine connected thereto, of an exciter for the field magnet winding of the dynamo-electric machine having a main field magnet winding and two auxiliary field magnet windings arranged to act in opposition, resistances in circuit, respectively, with the auxiliary field magnet windings, and means for shunting the one or the other of the resistances comprising co-acting contact terminals one of which is responsive in operation to variations of current in said circuit.

4. The combination with an electrical circuit, and a dynamo-electric machine connected thereto, of an exciter for the field magnet winding of the dynamo-electric machine having a main field magnet winding and two auxiliary field magnet windings arranged to act in opposition, resistances in circuit, respectively, with the auxiliary field magnet windings, and means for shunting the one or the other of the resistances comprising co-acting contact terminals that are responsive in operation, respectively, to variations of current in said circuit and to the voltage of the exciter circuit.

5. The combination with an electrical circuit, a storage battery and a booster generator connected thereto, of an exciter generator for supplying the field magnet winding of the booster generator having two field magnet windings arranged to act in opposition, resistances respectively in circuit therewith, and means for shunting the one or the other of the resistances that is responsive in operation to variations in the current that traverses said circuit.

6. The combination with an electrical circuit, a storage battery and a booster generator connected thereto, of an exciter generator for supplying the field magnet winding of the booster generator having two field magnet windings arranged to act in opposition, resistances respectively in circuit therewith, and means for shunting the one or the other of the resistances that is responsive in operation to variations in the current that traverses said circuit and to the voltage of the exciter circuit.

7. The combination with an electrical circuit, a storage battery and a booster generator connected thereto, of an exciter generator for supplying the field magnet winding of the booster generator having a main field magnet winding and two auxiliary field magnet windings arranged to act in opposition, and means for causing the one or the other of the auxiliary windings to act in conjunction with, or in opposition to, the main winding.

8. The combination with an electrical circuit, a storage battery and a booster generator connected thereto, of an exciter generator for supplying the field magnet winding of the booster generator having a main field magnet winding and two auxiliary field magnet windings arranged to act in opposition, and means for causing the one or the other of the auxiliary windings to act in conjunction with the main winding, or to act in opposition thereto, and to thereby effect reversal of the polarity of the filed magnetism so that the main and auxiliary windings may thereafter act in conjunction.

9. The combination with an electrical circuit, a storage battery, and a booster generator connected thereto, of an exciter generator having field magnet windings arranged to act in opposition, and means for adjusting the magnetizing effects of said windings in response to variations in the current traversing said circuit and to the voltage of the exciter generator.

10. A system of distribution comprising an electrical circuit, a storage battery, a generator having a main field magnet winding and two auxiliary field magnet windings, and means for so adjusting the relative magnetizing effects of the auxiliary field magnet windings as to cause either neutralization thereof or preponderance of the one or the other.

11. A system of distribution comprising an electrical circuit, a storage battery, a generator having a main field magnet winding and two auxiliary field magnet windings, and means for so adjusting the relative magnetizing effects of the auxiliary field magnet windings as to cause either neutralization thereof or preponderance of the one or the other, and to thereby govern the direction and value of the electromotive force of the generator.

12. A system of distribution comprising an electrical circuit, a storage battery, a generator having a main field magnet winding and two auxiliary field magnet windings, and means, responsive in operation to electrical variations in said circuit, for so adjusting the relative magnetizing effects of the auxiliary field magnet windings as to cause either neutralization thereof or preponderance of the one or the other.

13. A system of distribution comprising an electrical circuit, a storage battery, a generator having a main field magnet winding and two auxiliary field magnet windings, and means, responsive in operation to electrical variations in said circuit, for so adjusting the relative magnetizing effects of the auxiliary field magnet windings as to cause either neutralization thereof or preponderance of the one or the other, and to thereby govern the direction and value of the electromotive force of the generator.

14. A system of distribution comprising an electrical circuit, a storage battery, a generator having a main field magnet winding and two auxiliary field magnet windings, and means, responsive in operation to electrical variations in said circuit, for so adjusting the relative magnetizing effects of the auxiliary field magnet windings as to govern the direction and value of the electromotive force of the generator.

15. A system of distribution comprising an electrical circuit, a storage battery, a generator having two field magnet windings, and means for so adjusting the relative magnetizing effects thereof as to cause either neutralization thereof or preponderance of the one or the other, the said means being responsive in operation to variations of the amount of current traversing the circuit and of the voltage of the generator.

16. A system of distribution comprising an electrical circuit, a storage battery, a generator associated therewith, an exciter for the generator, and means for governing the direction and value of the generator electromotive force, the said means being responsive in operation to variations of the amount of current traversing the circuit and of the voltage of the exciter.

17. A system of distribution comprising an electrical circuit, a storage battery, a generator having two field magnet windings, resistances respectively in circuit with the field magnet windings, and means for adjusting the effective values of the said resistances in order to cause either neutralization, or preponderance of the one or the other, of the magnetizing effects of the field magnet windings, the said means being responsive in operation to variations of the amount of current traversing the circuit and of the voltage of the generator.

18. A system of distribution comprising an electrical circuit, a storage battery, a generator having a main field magnet winding and two auxiliary field magnet windings, resistances respectively in circuit with the auxiliary field magnet windings, and means, responsive in operation to electrical variations in said circuit, for adjusting the effective values of the said resistances in order to cause either neutralization, or preponderance of the one or the other, of the magnetizing effects of the auxiliary field magnet windings.

19. A system of distribution comprising an electrical circuit, a storage battery, a generator associated therewith, an exciter for the generator having two field magnet windings, resistances respectively in circuit with the field magnet windings, and means for adjusting the effective values of said resistances, the said means being responsive in operation to variations of the amount of current traversing the circuit and of the voltage of the exciter.

20. A system of distribution comprising an electrical circuit, a storage battery, a generator associated therewith, an exciter for the generator having a main field magnet winding and two auxiliary field magnet windings, resistances respectively in circuit with the auxiliary field magnet windings, and means for adjusting the effective values of the said resistances, the said means being responsive in operation to variations of the amount of current traversing the circuit and of the voltage of the exciter.

21. A system of distribution comprising an electrical circuit, a storage battery, a generator having a main field magnet winding and two auxiliary field magnet windings, and means, responsive in operation to electrical variations in said circuit, for adjusting the relative magnetizing effects of the auxiliary field magnet windings.

22. A system of distribution comprising an electrical circuit, a storage battery, a generator having two field magnet windings, and means for adjusting the relative magnetizing effects thereof in response to variations of the current traversing the circuit and of the voltage of the generator.

23. A system of distribution comprising an electrical circuit, a storage battery, a generator having two field magnet windings, resistances respectively in circuit therewith, and means for adjusting the effective values of the resistances in response to variations of the current traversing the circuit and of the voltage of the generator.

24. In a dynamo-electric machine, the combination of differential windings in the field of said machine, a resister included in circuit of one of said windings, and means for rapidly opening and closing a shunt around said resister and for controlling the relative length of the interval during which said shunt is closed.

25. In combination, a dynamo-electric machine, and means for alternately applying to the field of said machine a maximum and a minimum excitation and for varying the polarity and relative duration of such maximum and minimum excitation.

26. In combination, a storage battery and its complementary booster and connections, with means for alternately applying to the field of the booster a maximum and a minimum excitation and for varying the polarity and relative duration of such maximum and minimum excitation.

27. In combination, the field winding of a dynamo-electric machine, means for alternately applying to said field winding a maximum and a minimum excitation, and electro-responsive means responsive to changes in the electrical condition of an electric circuit for causing the aforesaid means to vary the polarity and relative duration of maximum and minimum excitation.

28. In combination, a storage battery and its complemental booster and connections, means for alternately applying to the field winding of the booster a maximum and a minimum excitation, and means for causing the aforesaid means to vary the polarity and relative duration of maximum and minimum excitation.

29. In a system of distribution, the combination with a storage battery and a booster in series therewith connected across a circuit, of an exciter for the booster, and a regulator for controlling the field of the exciter comprising means responsive to load on the system, and means coöperating therewith responsive to voltage on the exciter circuit.

30. In a system of distribution, the combination with a storage battery and a booster in series therewith connected across a circuit, of an exciter for the booster, a field coil for the exciter, coöperating contacts for controlling the duration of flow of current through said field coil, means responsive to load on said system for controlling one of said contacts, and means responsive to voltage on the exciter circuit for controlling the other contact.

31. In a system of distribution, the combination with a storage battery and a booster in series therewith connected across a main circuit, of an exciter for the booster, provided with a field circuit having resistance, a pair of contacts for varying the resistance of the field circuit of the exciter, a regulating coil connected in series with the main circuit for controlling one contact, and an exciter coil in shunt to the exciter circuit for controlling the other contact.

32. In combination, the field winding of a dynamo-electric machine, means for alternately applying to said field winding a maximum and minimum excitation and means for causing the aforesaid means to vary the polarity and relative duration of maximum and minimum excitation.

33. In combination, the field winding of a dynamo-electric machine, means for alternately applying to said field winding a maximum and a minimum excitation, and electro-responsive means for causing the aforesaid means to vary the relative number of applications of maximum and minimum excitation in a given time.

34. In combination, a storage battery and its complemental booster and connections, means for alternately applying to the field winding of the booster a maximum and a minimum excitation, and means for causing the aforesaid means to vary the number of applications of maximum and minimum excitation in a given time.

In testimony whereof, I have hereunto subscribed my name this 29th day of June, 1906.

FRANK CONRAD.

Witnesses:
C. AALBORG,
BIRNEY HINES.

---

It is hereby certified that in Letters Patent No. 1,112,438, granted October 6, 1914, upon the application of Frank Conrad, of Swissvale, Pennsylvania, for an improvement in "Systems of Electrical Distribution and Regulation," errors appear in the printed specification requiring correction as follows: Page 2, line 33, for the word "terminal" read *terminals;* page 4, line 77, for the word "filed" read *field;* page 5, lines 36-37, for the word "nuetralization" read *neutralization;* and that the said Letters Patent should be read with these corrections therein that the same may conform to the record of the case in the Patent Office.

Signed and sealed this 17th day of November, A. D., 1914.

[SEAL.]

R. F. WHITEHEAD,

*Acting Commissioner of Patents.*